J. G. PAGE.
PLOW.
APPLICATION FILED JUNE 5, 1911.

1,000,544.

Patented Aug. 15, 1911.

Witnesses

Inventor
J. G. Page
By Davis & Davis
Attorneys

UNITED STATES PATENT OFFICE.

JESSY G. PAGE, OF CUNNINGHAM, TENNESSEE, ASSIGNOR OF ONE-HALF TO JOHN H. HARPER, OF CUNNINGHAM, TENNESSEE.

PLOW.

1,000,544. Specification of Letters Patent. Patented Aug. 15, 1911.

Application filed June 5, 1911. Serial No. 631,320.

*To all whom it may concern:*

Be it known that I, JESSY G. PAGE, a citizen of the United States of America, and a resident of Cunningham, in the county of Montgomery and State of Tennessee, have invented certain new and useful Improvements in Plows, of which the following is a specification.

This invention relates to improvements in plows and particularly to new-ground plows, and the object of the present invention is to provide an implement of this character which shall be light, strong and efficient, and which can be easily manufactured at a moderate expense.

Figure 1:
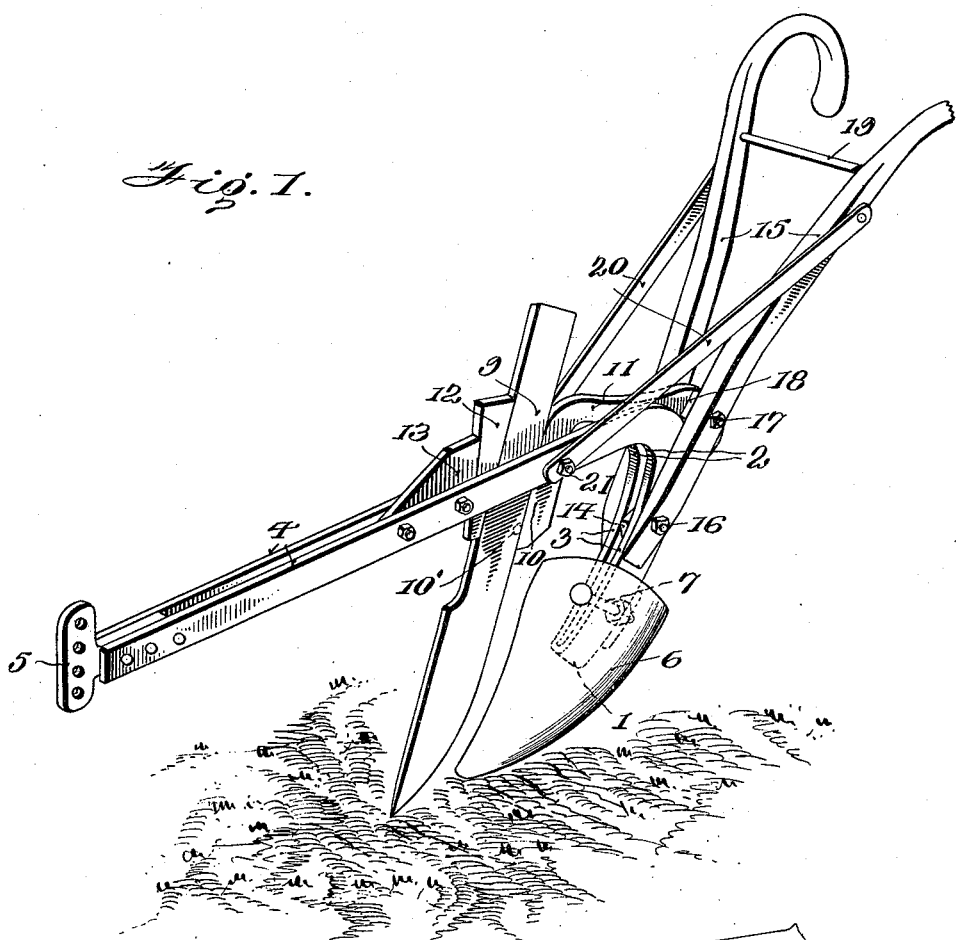
Figure 2:
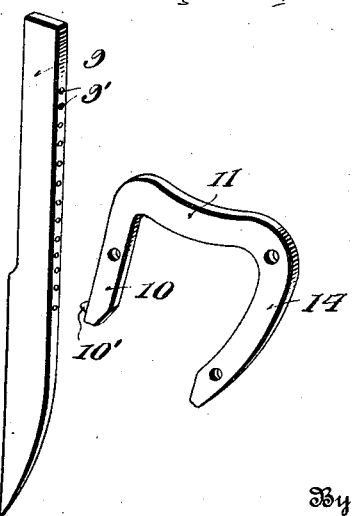
Figure 3:
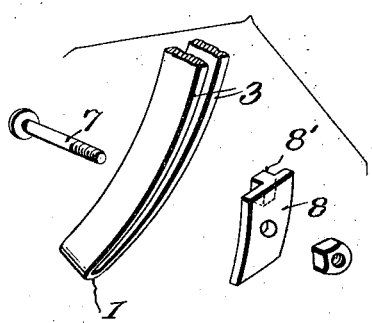

In the accompanying drawings—Figure 1 is a perspective view of my improved plow; Fig. 2 is a detail view showing the colter and brace; and, Fig. 3 is a detail view showing the plow-standard and the means for adjustably securing the shovel thereto.

The beam and standard of my plow are made of a single flat bar of iron or steel doubled upon itself flatwise as shown at 1 and this double bar being bent edgewise at an acute angle as shown at 2. The side members 3—3 of the standard and the side members 4—4 of the beam thus formed are spaced apart as shown in Figs. 1 and 3 for the purpose hereinafter described, and a suitable clevis or hitch 5 is secured to the front end of the beam.

A plow shovel 6 is adjustably secured to the lower end of the standard by a bolt 7 extending through the shovel and between the side members 3—3 of the standard and through a washer 8 at the back of the standard, which washer is held in place by a lug 8′ extending between the side members of the standard. A colter 9 is adjustably secured between the side members 4—4 of the beam, the colter being clamped in its adjusted position against the front edge of the downwardly and forwardly depending forward arm 10 of a brace 11 by means of a wedge 12 driven between the front edge of the colter and the rear edge of a block 13 bolted between the side members of the beam. To assist in locking the colter 9 in its adjusted position the rear edge of the colter is provided with a series of sockets 9′ (as shown in Fig. 2) in which a lug 10′ on the front edge of the arm 10 of brace 11 is adapted to engage.

The brace 11 extends rearwardly between the side members of the beam and at a point back of the standard it is bent downwardly and forwardly at an acute angle to form a depending arm or brace 14 the lower end of which terminates between the side members 3—3 of the standard at a point above the shovel 6. The lower ends of the plow handles 15 are bolted against the respective outer faces of the side members 3—3 of the standard by a bolt 16 which extends through the lower ends of the handles, the side members 3—3 of the standard, and the lower end of the depending arm 14 of brace 11, and at a point near the juncture of the beam and standard the handles are bolted together by a bolt 17 which extends through the handles, the brace 11 and a pair of spacing-blocks 18 between the opposite sides of the brace and the respective inner faces of the handles. At a point just above the bolt 17 the handles are bowed or bent outwardly and are braced apart near their upper ends by a rung or rod 19. To further brace and strengthen my plow, I provide a pair of brace-bars 20 the upper ends of which are bolted to the handles 15 near the upper ends of said handles and the lower ends of which brace-bars are bolted to the respective outer faces of the side members 4—4 of the plow beam by means of a bolt 21 which extends through said brace-bars and side members 4—4 and through the depending arm 10 of brace 11.

It will be observed that by the construction above described I provide a plow which is very simple, strong and durable in construction and efficient in operation and which can be manufactured at a low cost.

Having thus fully described my invention, what I claim as new, and desire to secure by Letters Patent, is:—

In a plow, the combination of a plow beam and standard formed of a pair of parallel bars, a brace secured between the side members of the beam at the rear end thereof and having a downwardly extending arm at each end, the forward arm being positioned to afford a rigid abutment for the colter, the rear arm terminating between the bars of the standard, and a pair of plow handles secured at their lower ends to the standard and the rear arm of the brace.

In testimony whereof I hereunto affix my signature in the presence of two witnesses.

JESSY G. PAGE.

Witnesses:
W. S. MINOR,
J. T. POOL.

Copies of this patent may be obtained for five cents each, by addressing the "Commissioner of Patents, Washington, D. C."